(12) United States Patent
Barker

(10) Patent No.: US 6,498,471 B2
(45) Date of Patent: Dec. 24, 2002

(54) APPARATUS AND METHOD FOR DIRECT DIGITAL MEASUREMENT OF ELECTRICAL PROPERTIES OF PASSIVE COMPONENTS

(76) Inventor: A. Clifford Barker, c/o Recognition Systems, Inc. 1520 S. Delaware Pl., Tulsa, OK (US) 74104

( * ) Notice: Subject to any disclaimer, the term of this patent is extended or adjusted under 35 U.S.C. 154(b) by 0 days.

(21) Appl. No.: 10/020,206

(22) Filed: Dec. 18, 2001

(65) Prior Publication Data

US 2002/0084776 A1 Jul. 4, 2002

Related U.S. Application Data

(63) Continuation-in-part of application No. 09/563,295, filed on May 3, 2000, now Pat. No. 6,373,235.
(60) Provisional application No. 60/132,424, filed on May 4, 1999.

(51) Int. Cl.[7] .......................... G01R 23/12; H03B 1/00; H03L 7/00
(52) U.S. Cl. ..................... 324/76.53; 331/74; 331/18
(58) Field of Search ..................... 331/1, 48, 2, 74, 331/18; 324/76.53

(56) References Cited

U.S. PATENT DOCUMENTS

| | | | |
|---|---|---|---|
| 3,319,178 A | 5/1967 | Broadhead, Jr. | 331/1 |
| 3,370,251 A | 2/1968 | Overstreet, Jr. | 331/55 |
| 3,611,175 A | 10/1971 | Boelke | 331/4 |
| 3,805,181 A | 4/1974 | Charbonnier | 345/158 |
| 3,931,585 A | 1/1976 | Barker et al. | 331/1 |
| 4,070,634 A | 1/1978 | Barker et al. | 331/2 |
| 4,071,691 A | 1/1978 | Pepper, Jr. | 178/19 |
| 4,088,904 A | 5/1978 | Green | 307/308 |
| 4,103,252 A | 7/1978 | Bobick | 331/48 |
| 4,323,829 A | 4/1982 | Witney et al. | 318/55 |
| 4,680,429 A | 7/1987 | Murdock et al. | 178/19 |
| 4,698,461 A | 10/1987 | Meadows et al. | 178/19 |
| 4,806,709 A | 2/1989 | Evans | 178/19 |
| 4,808,979 A | 2/1989 | DeHoff et al. | 340/709 |
| 4,903,012 A | 2/1990 | Ohuchi | 340/709 |
| 4,922,061 A | 5/1990 | Meadows et al. | 178/19 |
| 4,980,519 A | 12/1990 | Mathews | 178/19 |
| 5,059,959 A | 10/1991 | Barry | 340/709 |
| 5,101,197 A | 3/1992 | Hix et al. | 340/784 |
| 5,166,679 A | 11/1992 | Vranish et al. | 340/870.37 |
| 5,168,531 A | 12/1992 | Sigel | 382/48 |
| 5,214,388 A | 5/1993 | Vranish et al. | 324/683 |
| 5,247,261 A | 9/1993 | Gershenfeld | 324/716 |
| 5,319,387 A | 6/1994 | Yoshikawa | 345/179 |
| 5,325,133 A | 6/1994 | Adachi | 351/209 |
| 5,339,095 A | 8/1994 | Redford | 345/158 |
| 5,394,183 A | 2/1995 | Hyslop | 348/88 |
| 5,448,261 A | 9/1995 | Koike et al. | 345/158 |
| 5,453,758 A | 9/1995 | Sato | 345/158 |

(List continued on next page.)

Primary Examiner—Christine Oda
Assistant Examiner—Wasseem H. Hamdan
(74) Attorney, Agent, or Firm—Miles & Stockbridge P.C.

(57) ABSTRACT

A high-resolution apparatus and method provide direct digital measurement of electrical properties such as resistance, capacitance or inductance. An excitation signal derived from a high-frequency source is applied to a network containing an unknown device to produce a network output signal with an amplitude that corresponds to the electrical property to be measured. Amplitude variations in the network output signal are converted to corresponding phase variations in a third signal by adding the network output signal to a reference signal that is phase shifted by 90-degrees with respect to the excitation. The third signal is then applied to a phaselocked loop that employs the above-mentioned high-frequency source in combination with a pulse delete circuit to produce an output that multiplies phase information contained in the third signal by orders of magnitude. Conventional methods can then be used to measure the resulting greatly magnified phase changes corresponding to minute changes in the electrical properties of the device under test.

26 Claims, 13 Drawing Sheets

U.S. PATENT DOCUMENTS

| | | | |
|---|---|---|---|
| 5,457,289 A | 10/1995 | Huang et al. | 178/20 |
| 5,463,388 A | 10/1995 | Boie et al. | 341/33 |
| 5,469,194 A | 11/1995 | Clark et al. | 345/173 |
| 5,502,459 A | 3/1996 | Marshall et al. | 345/158 |
| 5,777,550 A * | 7/1998 | Maltby et al. | 340/514 |
| 5,790,602 A | 8/1998 | Stephens | 375/326 |
| 5,990,865 A | 11/1999 | Gard | 345/156 |

* cited by examiner

APPARATUS AND METHOD FOR DIRECT DIGITAL MEASUREMENT OF ELECTRICAL PROPERTIES OF PASSIVE COMPONENTS

This is a continuation in part of U.S. patent application Ser. No. 09/563,295 filed May 3, 2000, U.S. Pat. No. 6,373,235 B1 patent on Apr. 16, 2002 and takes the benefit of provisional application No. 60/132,424 filed May 4, 1999, incorporated herein by reference.

FIELD OF THE INVENTION

The present invention is concerned with measurement of physical phenomena, properties or conditions such as values of resistance, capacitance or inductance, for example, and is more particularly concerned with apparatus and methods for direct digital measurement of minute changes in electrical properties that correspond to changes in related physical phenomena such as mechanical strain, displacement or temperature, for example.

BACKGROUND

Strain gages and resistive temperature sensors are inexpensive and have been widely used for decades for mechanical design, test and measurement. Various configurations of strain gages are widely employed to measure pressure, weight, torque and mechanical displacement in addition to the direct measurement of strain in engineering design and test. Far more widespread use of such sensors for monitoring, detection and warning of conditions that could, for example, indicate an impending failure has been impeded by the cost, and, to some extent, the size and complexity, of electronics required to convert resistance values to useful measurements. Similar considerations have also limited more extensive use of capacitance and inductance sensors.

Measurements of physical phenomena that produce resistance or reactance changes typically employ a four-element Wheatstone bridge comprising a combination of one or more sensor elements with fixed-value passive components. Such a network is termed a quarter-, half- or full-bridge configuration depending upon whether one, two or all four of the elements are sensors. The Wheatstone bridge configuration is ideal for maximizing measurement sensitivity. This is accomplished by selecting component values to provide zero output for the unstressed or no-load condition, allowing the bridge output signal to be greatly amplified.

In the prior art, a precisely-controlled, fixed DC voltage is applied to the Wheatstone bridge or other network containing the sensing elements. The output is then amplified, with additional circuitry employed to cancel DC offset errors introduced by the amplifier circuits. The amplified DC analog signal is then applied to an analog-to digital converter to obtain a digital output. This approach involves considerable cost and complexity and is susceptible to errors due to lead length, noise pickup and other error sources such as ambient temperature variations.

It is often required to measure outputs from multiple independent sensors, either simultaneously or in a repeating sequence. Prior art teaches the use of analog multiplexers, sample-and-hold circuits, together with associated control circuits such as scan, trigger, and address decode to implement such multi-channel systems. This additional cost and complexity further limits more widespread use of low-cost passive sensors.

BRIEF SUMMARY OF THE INVENTION

It is accordingly an object of the present invention to provide an apparatus and method for precise, high-resolution direct digital measurement of phenomena which produce changes in electrical properties such as resistance, capacitance and inductance.

Another object of the invention to provide an apparatus and method of the above-described type capable of multiple independent, simultaneous measurements using a single reference oscillator and logic device.

Another object of the invention is to minimize noise sensitivity in an apparatus and method of the above-described type by employing synchronous detection of low-frequency sensor signals to achieve extremely narrow noise bandwidth.

Another object of the invention to provide an apparatus and method of the above-described type which is low in cost.

Another object of the invention is to minimize errors due to temperature and voltage variations in an apparatus and method of the above-described type through the use of excitation and reference signals derived from a common source.

It is a further object of the invention is to eliminate the need for DC offset correction by employing AC excitation.

Briefly stated, the present invention provides high-accuracy, high-resolution apparatus, systems and methods that employ phase shifts in a fixed-frequency signal for measurement of electrical properties such as capacitance, inductance or resistance.

In accordance with a preferred embodiment of the invention, two sinusoidal signals of identical frequency and 90 degrees out of phase are generated from a single reference oscillator. One is designated "excitation," the other, "reference."

The excitation signal is applied to a network such as a Wheatstone bridge comprising both fixed-value components and one or more sensing elements. The values of the bridge components are preferably selected to provide minimum voltage output when the sensing elements are unstressed and an output level (amplitude) proportional to stress applied to the sensing elements when a stress such as a force or temperature change is applied.

The output of the bridge is amplified and then applied as one input to a summing amplifier, the other input being the above-described reference signal. All signal levels are constrained to remain within the linear range of amplifier circuitry employed.

As the amplified output of the Wheatstone bridge ranges from zero to a maximum amplitude equal to that of the reference signal, the phase $\theta$ of the summing amplifier output with respect to the reference signal will vary from 0° to 45°.

High-resolution measurement of $\theta$ is accomplished by applying the summing amplifier output to a unique phase-locked loop mechanization to produce a loop output signal that multiplies phase changes in the summing amplifier output by orders of magnitude. In the loop, the input from the summing amplifier and the loop feedback signal are applied to a phase detector, the output of which is used to produce a loop output signal at a frequency that is a multiple of the summing amplifier input frequency. The loop output signal is used to delete pulses from the reference oscillator signal, which is at a much higher frequency than the loop output signal. The output of the pulse delete circuit is then applied to a divider, the output of which is equal in frequency to the summing amplifier input signal. The result of this arrangement is that phase changes in the summing amplifier input to the loop are multiplied in the loop output by the same constant used to divide down the output of the pulse delete circuit.

The loop output signal is then compared with a signal at the same frequency derived from the reference oscillator using logic that converts cycle slips between the two signals into up/down counts. The resulting up/down counts can then be directly applied to an indicating device, recorder or to a microprocessor or microcontroller.

BRIEF DESCRIPTION OF THE DRAWINGS

The invention will be further described in conjunction with the accompanying drawings, which illustrate preferred and exemplary embodiments, and wherein.

DETAILED DESCRIPTION OF PREFERRED EMBODIMENTS

Figure 1:
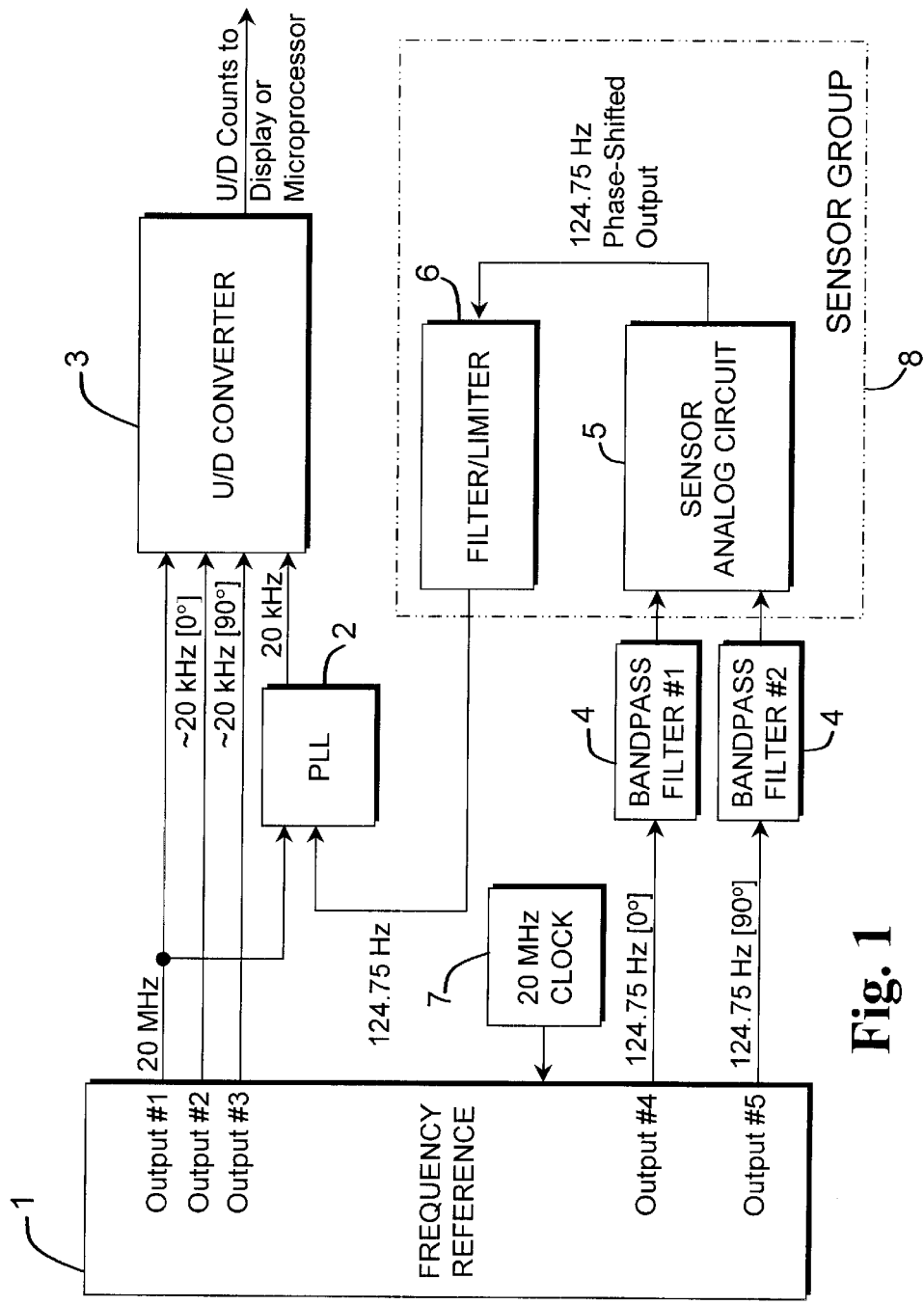
FIG. 1 is a block diagram of an apparatus for direct digital measurement of phenomena that produce changes in electrical resistance in accordance with the invention.

FIG. 1 is a block diagram of one embodiment of the invention. In a physical implementation, functions performed within the Frequency Reference 1, PLL (phaselocked loop) 2 and U/D (up/down) Converter 3 are preferably combined within a single programmable logic device such as a field-programmable gate array (FPGA), application-specific integrated circuit (ASIC) or the like. The primary frequency source is a 20 MHz Clock 7. Bandpass Filters 4, Sensor Analog Circuit 5 and Filter/Limiter 6 comprise physically distinct analog circuits, the latter two comprising the Sensor Group 8, enclosed within a dashed line in the figure.

Figure 2:
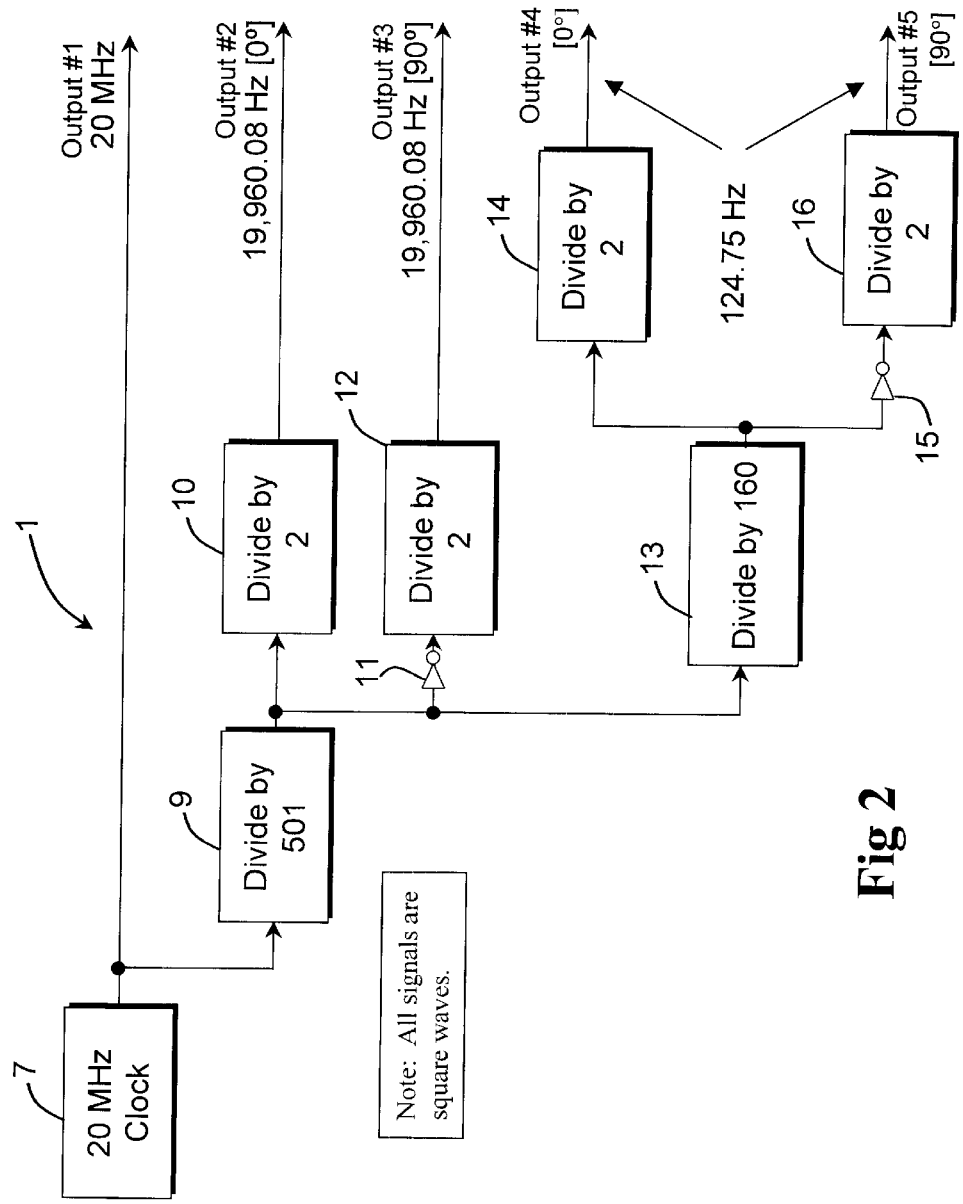
FIG. 2 is a detailed block diagram of a FREQUENCY REFERENCE shown in FIG. 1.

FIG. 2 is a detailed block diagram of Frequency Reference 1 (FIG. 1). The square-wave output of 20 MHz Clock 7 is used to synthesize four signals, which, together with the clock signal, comprise the five outputs of the Frequency Reference. These signals are used to implement the functions performed by the other blocks in FIG. 1.

The 20 MHz. Clock 7 is a widely available commercial device. Its output is applied to Divide-by-501 circuit 9 followed by Divide-by-2 circuit 10, both of conventional design, to produce Output #2 of approximately 19,960.08. Hz. The Divide-by-2 circuit 10 assures that Output #2 will be symmetrical (i.e., exactly 50 percent duty cycle).

The output of Divide-by-501 9 is also applied to inverter 11 followed by Divide-by-2 12 to produce Output #3 in phase quadrature with Output #2 (i.e., the two signals are exactly 90 degrees out of phase).

The output of Divide-by-501 9 is also applied to Divide-by-160 circuit 13, then to Divide-by-2 14 to obtain symmetrical output #4 at approximately 124.75 Hz. The output of Divide-by-160 13 is also applied to inverter 15, followed by Divide-by-2 16 to produce output #5 in phase quadrature with Output #4.

Figure 3:
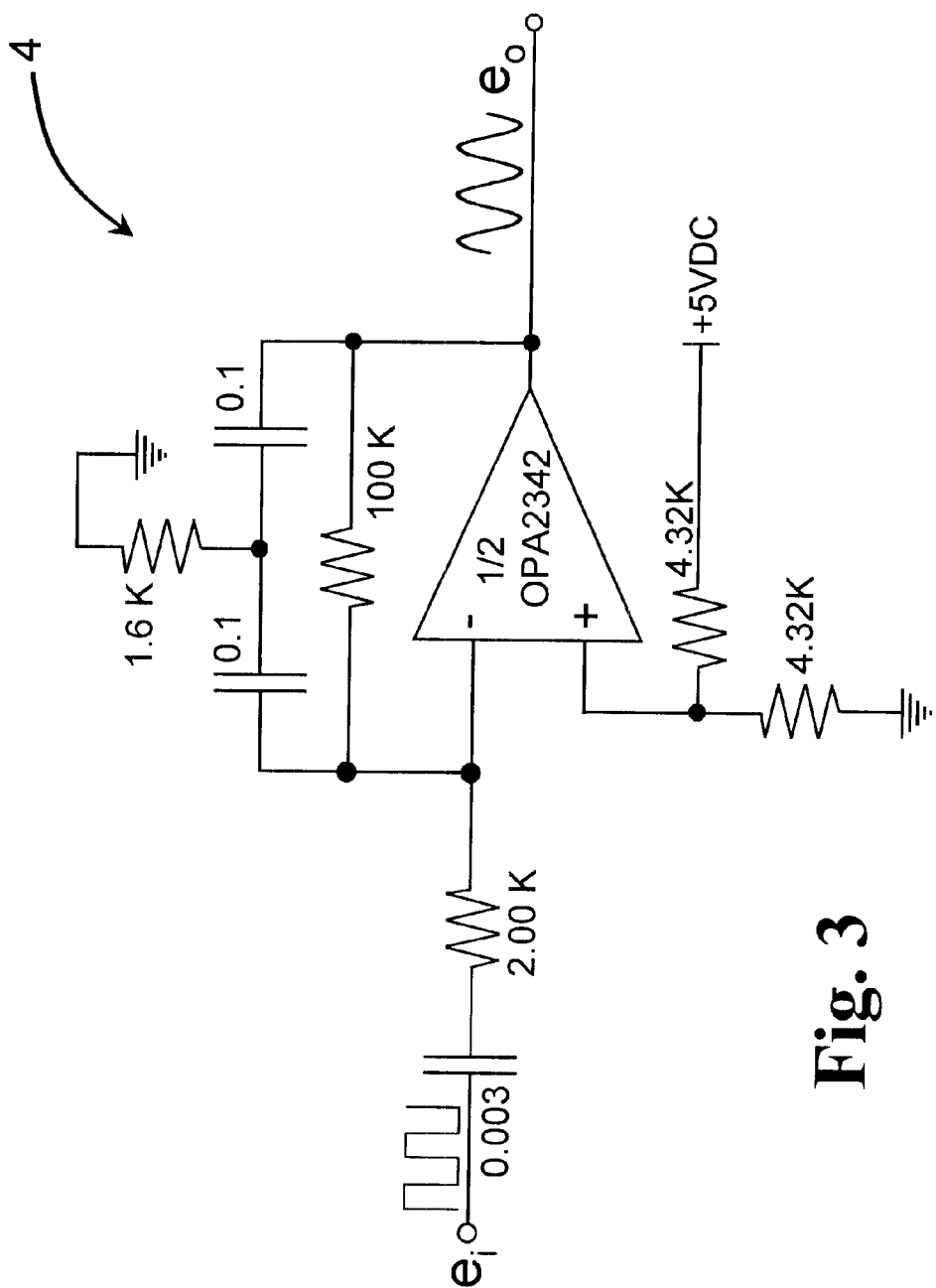
FIG. 3 is a schematic diagram of a BANDPASS FILTER shown in FIG. 1.

Square wave outputs #4 and #5 are applied to identical Bandpass filters 4 (FIG. 1). FIG. 3 is a schematic diagram of a typical filter of this type.

Figure 4:
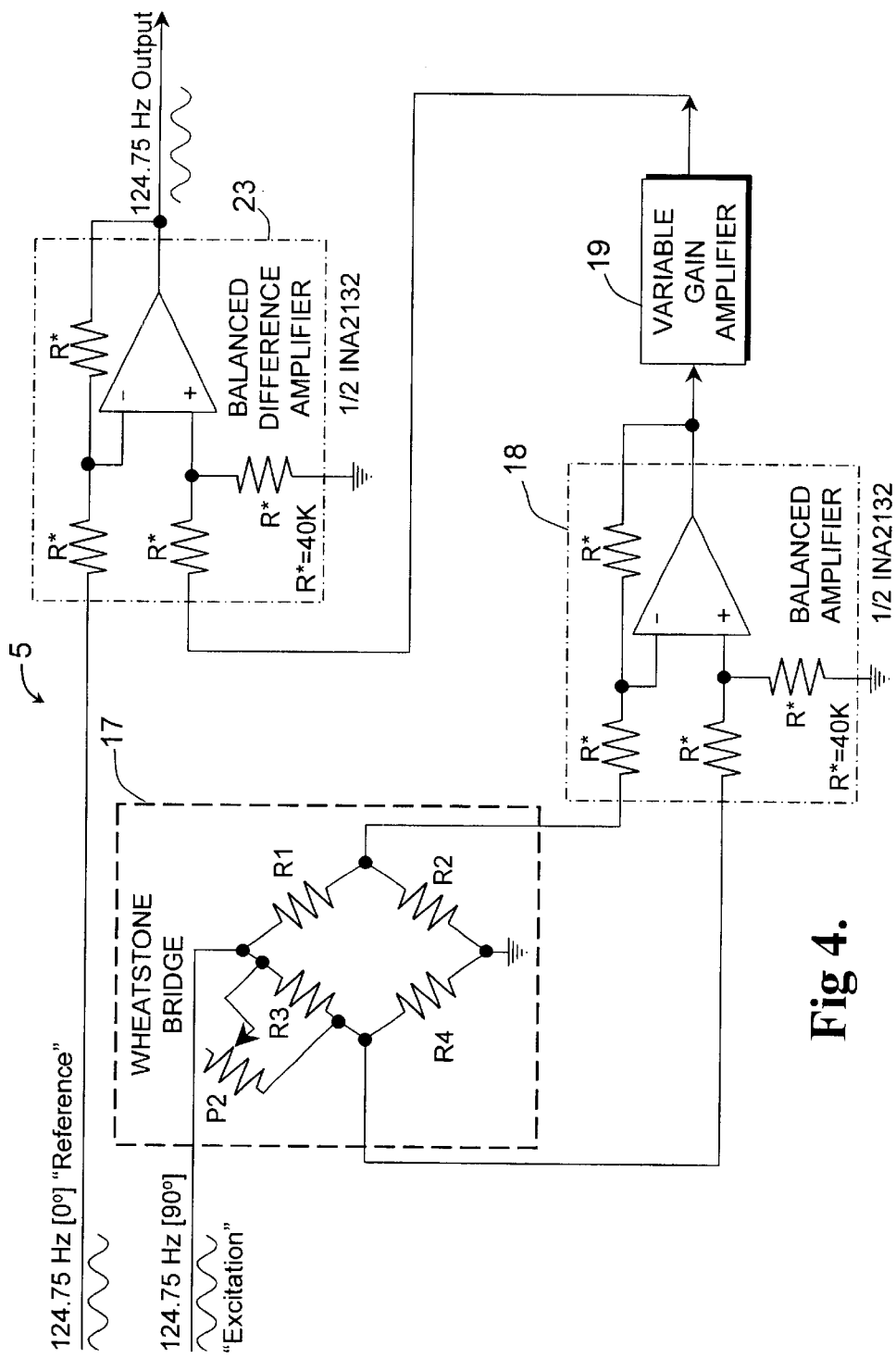
FIG. 4 is a diagram, partly in block form and partly in schematic, of a SENSOR ANALOG CIRCUIT shown in FIG. 1.

Again referring to FIG. 1, the sinusoidal outputs of Bandpass Filters 4 are then applied as inputs to Sensor Analog Circuit 5. FIG. 4 is a detailed diagram of Sensor Analog Circuit 5 (FIG. 1), partly in schematic and partly in block form. The phase quadrature output of Bandpass Filter #2 4 (FIG. 1), designated "excitation," is applied to Wheatstone Bridge 17 containing resistors R1, R2, R3 and R4, at least one of which is a sensor element. The Wheatstone Bridge is a typical circuit configuration for measuring changes in resistance. The input voltage is applied at the junction of R1 and R3 relative to the junction of R2 and R4 (ground). The bridge output is measured from the junction of R1 and R2 to the junction of R3 and R4. The bridge is said to be "balanced" when the ratio R1/R2 is equal to the ratio of the parallel combination of R3 and potentiometer P2 divided by R4. In a balanced state, the bridge output is zero. Bridge component values are selected so that a balanced condition exists when the sensor is unstressed, permitting outputs resulting from minute sensor resistance changes to be greatly amplified to maximize measurement sensitivity. Potentiometer P2 provides a means for fine balancing the output of Wheatstone Bridge 17.

Typically, one, two or all four resistors in the Wheatstone Bridge are sensor elements, designating the arrangement as a quarter, half, or full bridge, respectively.

The output of Wheatstone Bridge 17 is applied to balanced amplifier 18. A typical amplifier of this type consists of one half of a Burr Brown INA 2132, Dual Difference Amplifier, which contains internal laser-trimmed resistors to provide precise gain and high common mode rejection without the need for precision external resistors.

Figure 5:
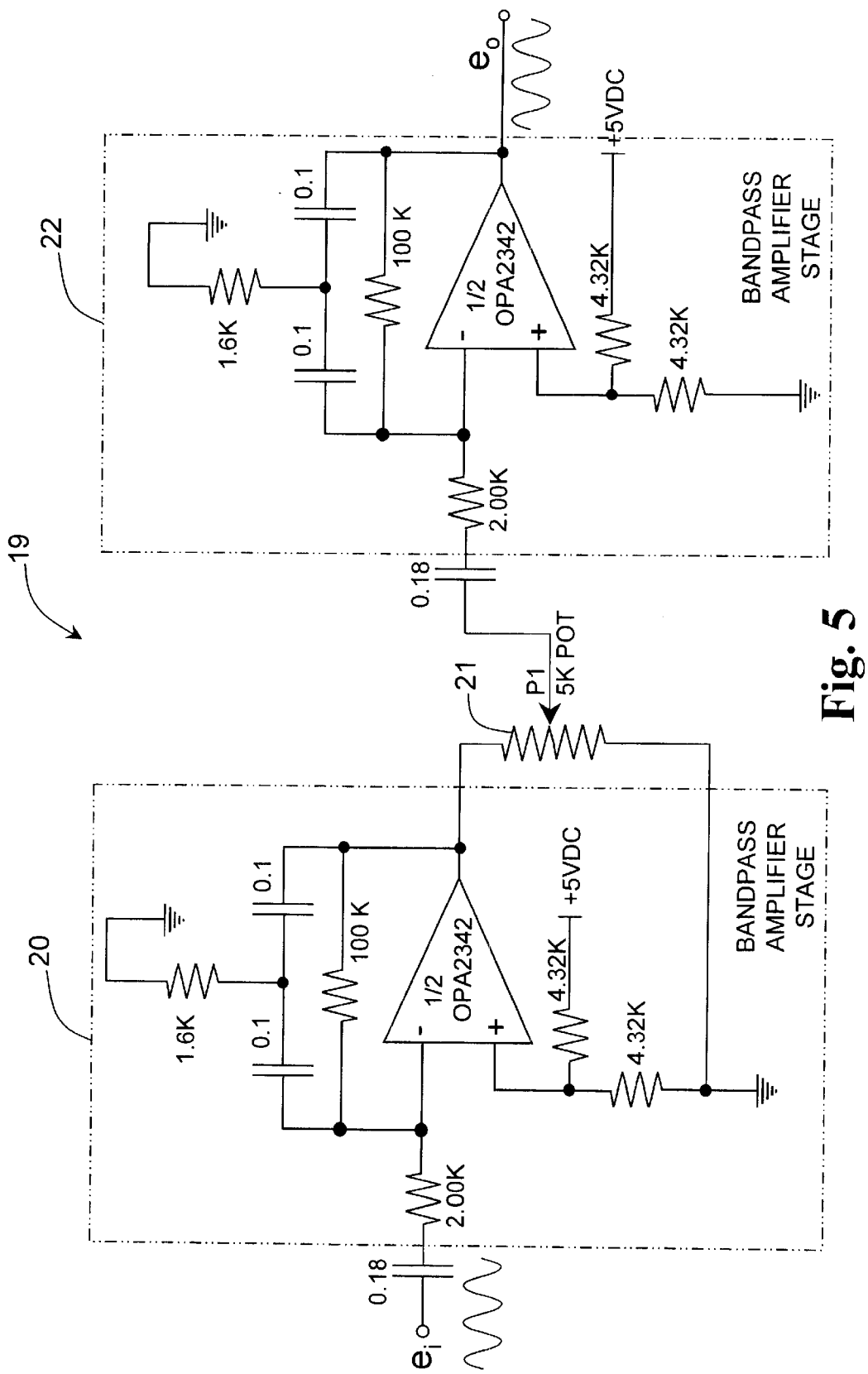
FIG. 5 is a schematic diagram of a VARIABLE GAIN AMPLIFIER shown in FIG. 4.

The output of balanced amplifier 18 is then applied to Variable Gain Amplifier 19, a typical design of which is shown in schematic form in FIG. 5. Variable Gain Amplifier 19 consists of fixed-gain, bandpass amplifier stage 20, followed by gain control potentiometer P1 21, which is used to adjust the overall gain of the circuit. Potentiometer P1 21 is followed by a second bandpass amplifier 22.

Again referring to FIG. 4, he output of Variable Gain Amplifier 19 is applied to one input of balanced difference amplifier 23, which comprises the second half of previously-mentioned Burr Brown Dual Difference Amplifier INA 2132. The other input to Difference Amplifier 23 is the "in-phase" 124.75 Hz [0°] "Reference " input signal.

The amplitude of inputs to difference amplifier 23 are constrained as follows:

1) Gain control potentiometer P1 21 (FIG. 5) is adjusted so that the maximum amplitude of the output of Variable Gain Amplifier 19 (FIG. 4) does not exceed the amplitude of the Reference signal to the other input to Difference Amplifier 23, and
2) The amplitude of both signals is such that Difference Amplifier 23 is always operating in its linear range.

When these two conditions are met, the phase of the output signal of Difference Amplifier 23 relative to the Reference input will vary between 0° when the output of Variable Gain Amplifier 19 is equal to zero and 45° when the amplitude of both inputs to Difference Amplifier 23 are equal.

Figure 6:
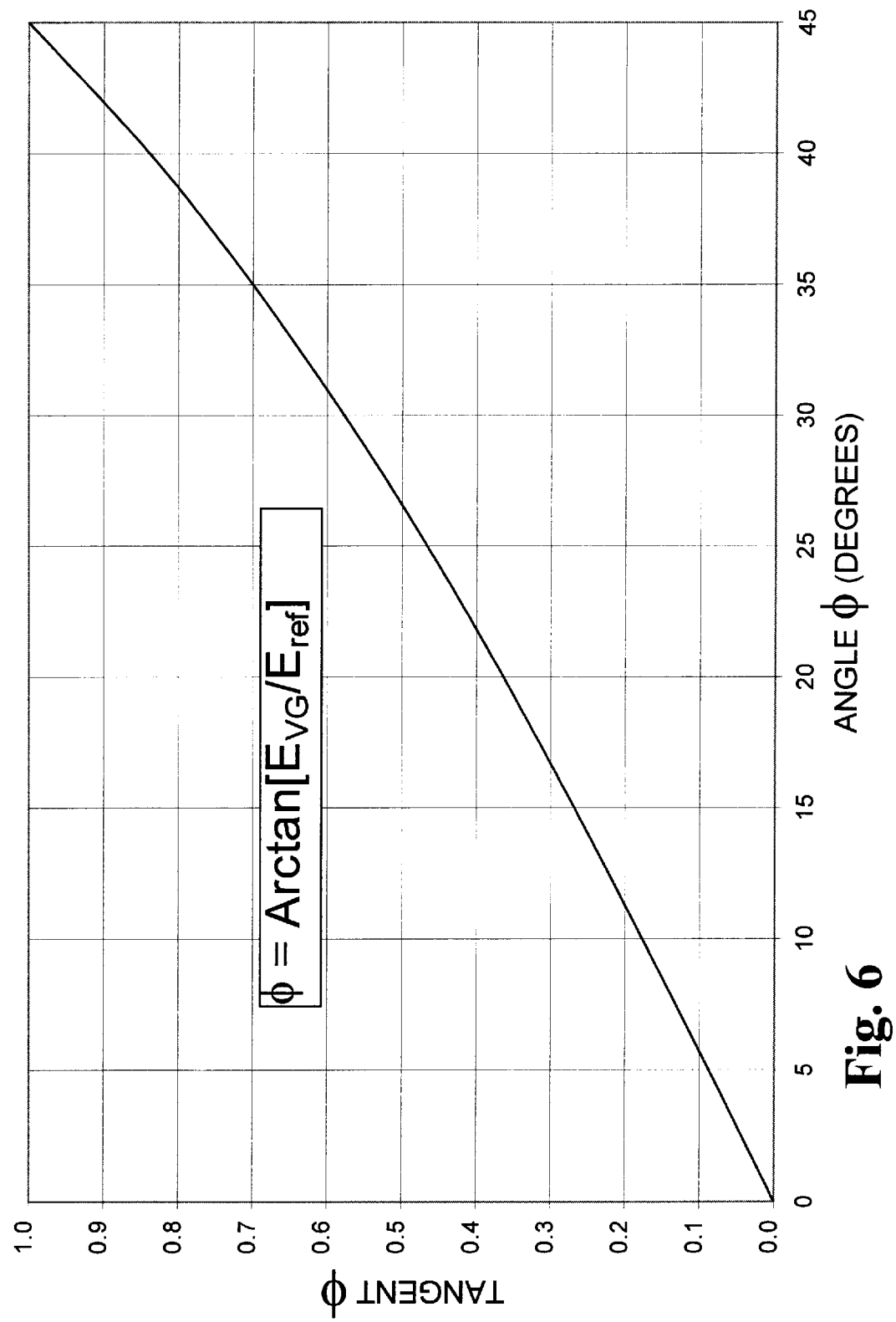
FIG. 6 is a graph depicting the relationship between the measured phase angle and the relative amplitude of the amplified bridge output with respect to the reference signal.

The phase $\phi$ of the output of Difference Amplifier 23 relative to the Reference input is equal to the arctangent of the ratio of the amplitude of the two input signals, given by $$\phi = \text{Arctan}[E_{VG}/E_{ref}]$$

where $E_{VG}$ is the amplitude of the output of Variable Gain Amplifier 19, and $E_{ref}$ is the amplitude of the Reference input signal. This relationship is shown graphically in FIG. 6.

Figure 7:
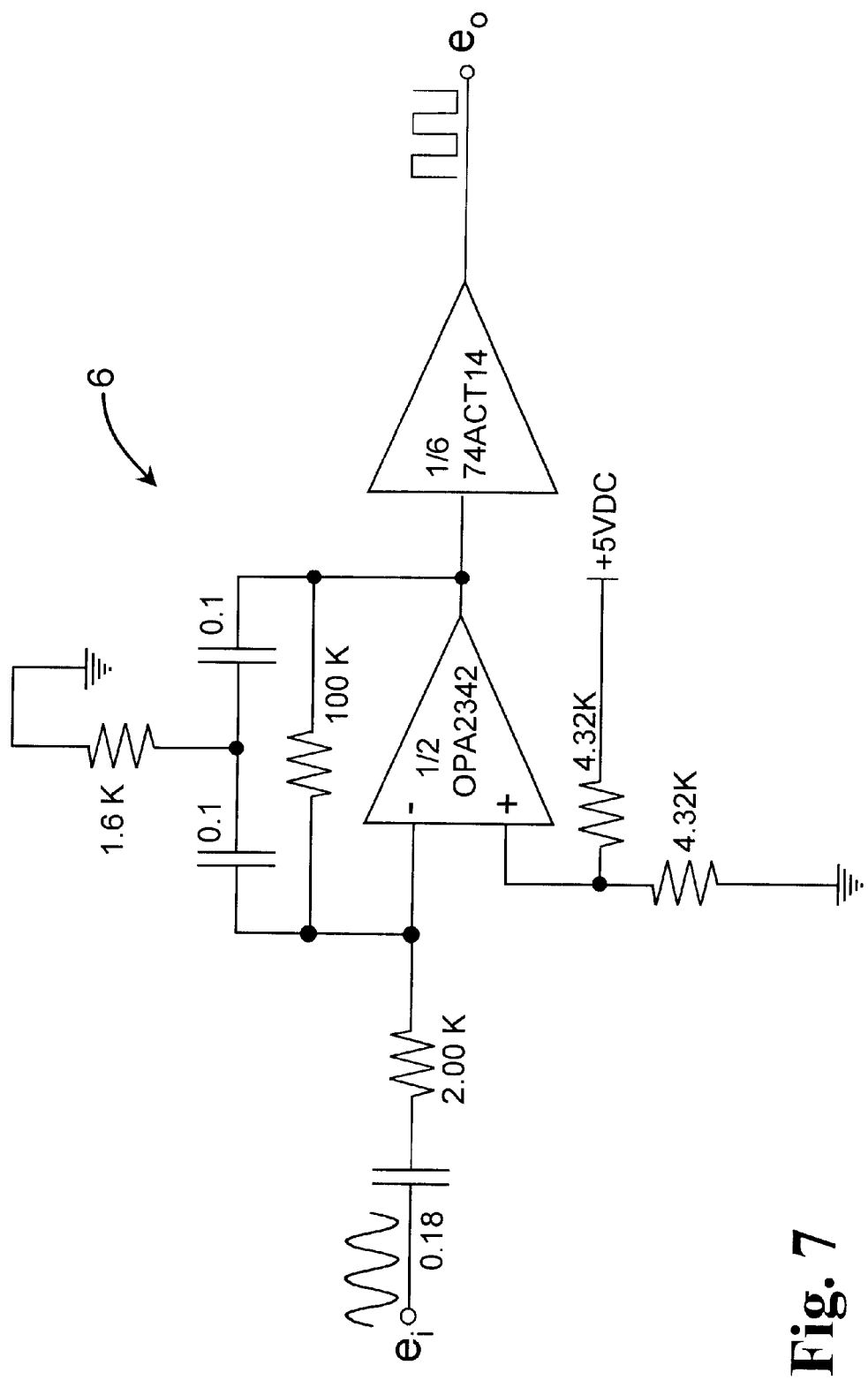
FIG. 7 is a schematic diagram of a FILTER/LIMITER shown in FIG. 1.

The phase-shifted sine wave output of Difference Amplifier 23 (FIG. 4), which corresponds to the output of Sensor Analog Circuit 5 (FIG. 1), is then applied to Filter/Limiter 6 (FIG. 1). FIG. 7 is a schematic of a typical Filter/Limiter circuit of this type. The circuit consists of an active filter followed by a limiter comprising one stage of a 74AC14 hex inverting Schmitt Trigger.

Figure 8:
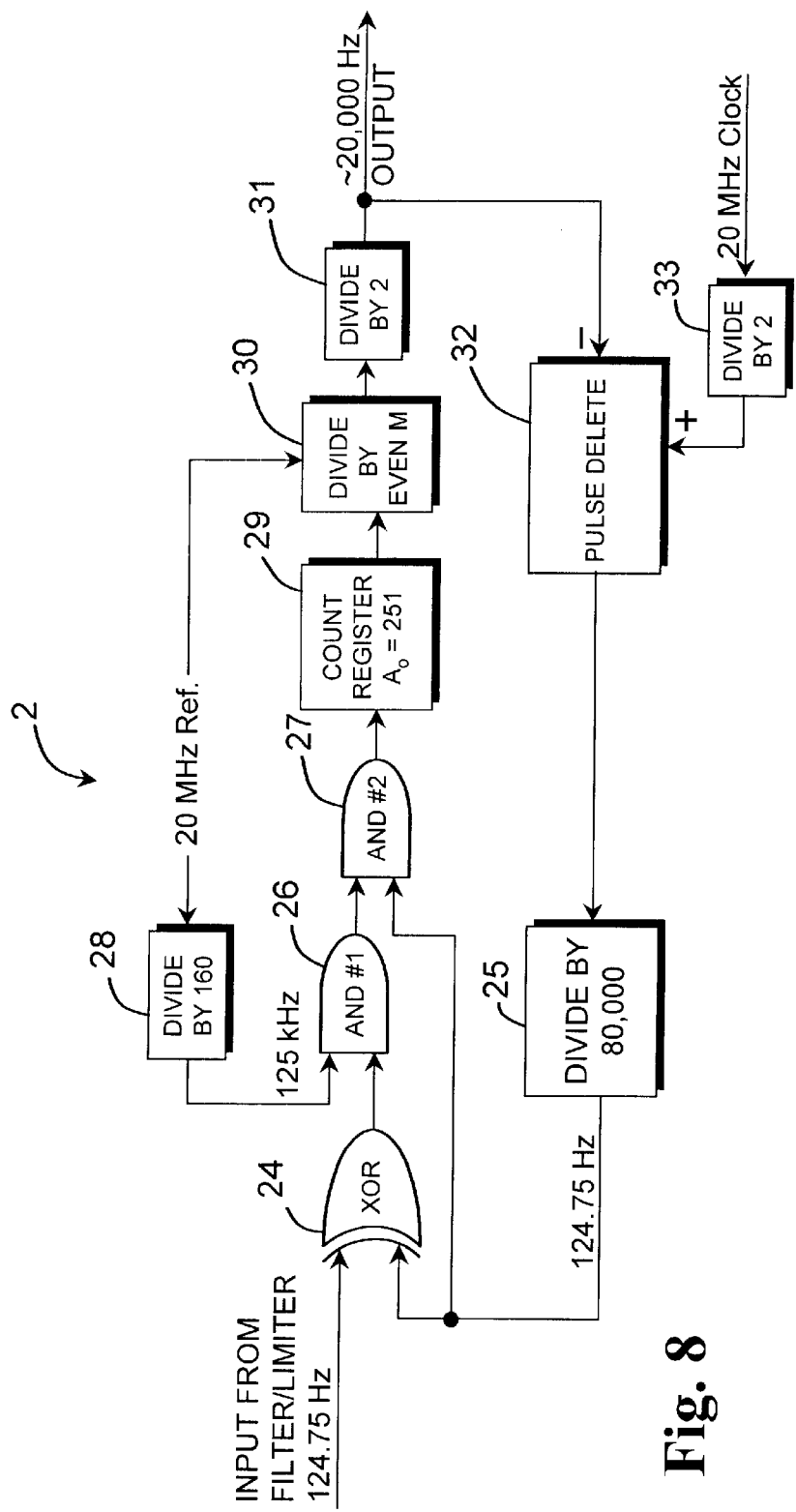
FIG. 8 is a detailed block diagram of a PLL (phaselocked loop) shown in FIG. 1.

Referring to FIG. 1, output of Filter/Limiter 6 is applied to phaselocked loop, PLL 2. PLL 2 is a digital phaselocked loop, implemented entirely within the previously mentioned logic array (FPGA or ASIC). FIG. 8 shows the detailed logic flow within PLL 2 (FIG. 1). When the loop is locked, inputs to XOR (exclusive OR) 24 from Filter/Limiter 6 (FIG. 1) and Divide by 80,000 25 will be identical in frequency and 90 degrees out of phase, causing the output of XOR 24 to be high during 50 percent of each 124.75 Hz cycle.

Figure 9:
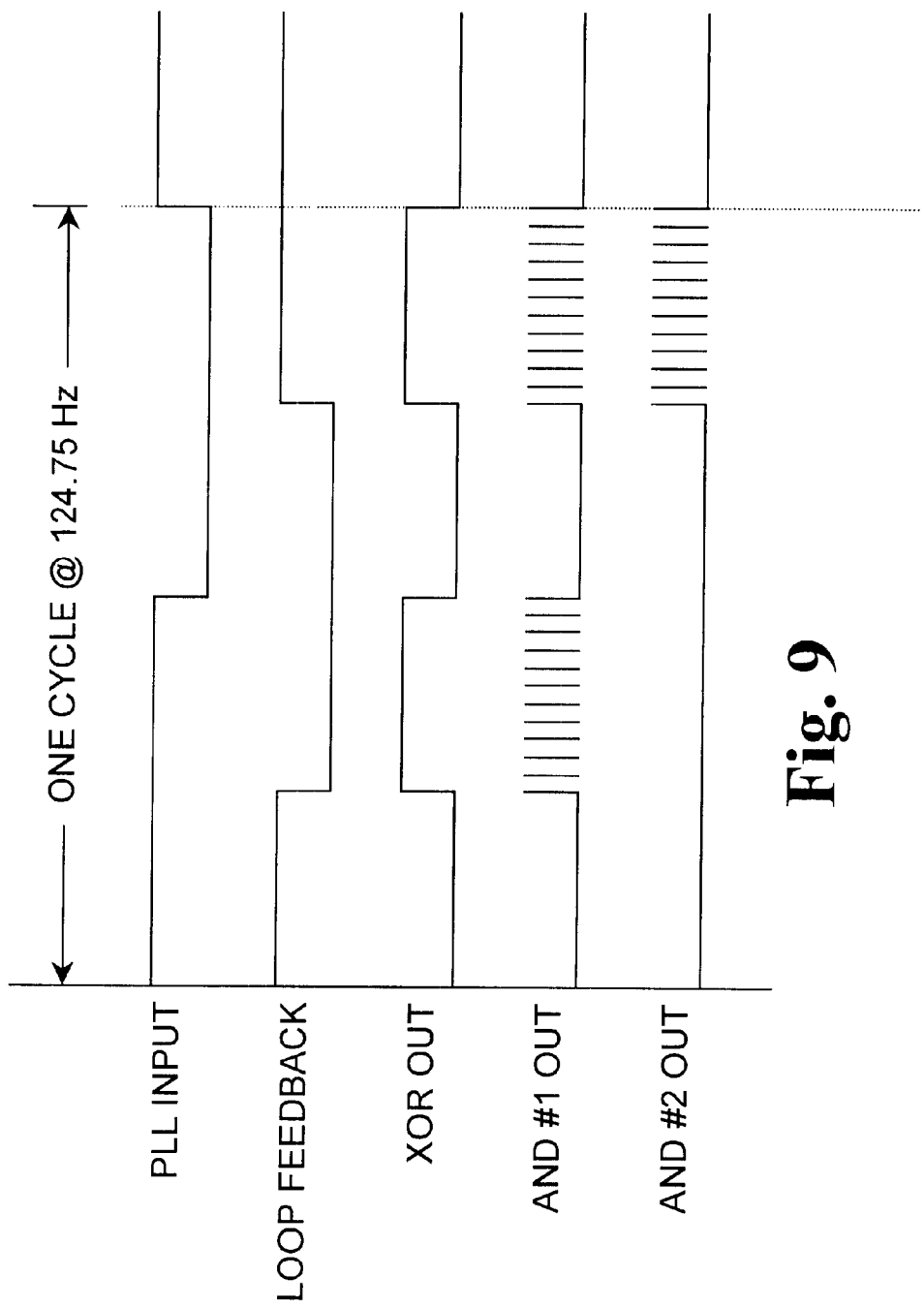
FIG. 9 is An explanatory waveform diagram depicting certain timing relationships within the phaselocked loop.

FIG. 9 shows the timing relationships among the inputs and output of XOR 24 and the outputs of AND #1 26 and AND #2 27 when the loop is locked. Due to the 90-degree phase relationship between the inputs to XOR 24, its output alternates between high and low at quarter-cycle intervals. This permits bursts of the 125 kHz output of Divide by 160 28 to appear at the output of AND #1 26. At lock, the number of pulses in each burst will average (¼ cycle)×(125,000 Hz)×(1/124.75 Hz)=250.5 pulses These bursts of pulses from AND #1 26 and the loop feedback signal from Divide by 80,000 25 are then applied to AND #2 27. From FIG. 9, it can be seen that only one of the two bursts of pulses appearing at the output of AND #1 26 during each cycle is passed to Count Register 29. Count Register 29 is preset to an initial value $A_o$ of 251 each cycle, so that, at lock, Count Register 29 will, on average, count to 501.5 (250.5+251). This value is transferred to Divide by Even M 30 each cycle, then reset to 251 to await the next burst from AND #2 27. The current value of M is used to divide the 20 MHz Reference input to Divide by Even M 30. The divisor M is forced to be an even number by ignoring its least significant bit (LSB). This prevents M from being exactly equal 501, which would produce a frequency at the output of the Divide by 80,000 25 exactly matching the input frequency, thereby causing the loop to converge to slightly different steady state phase errors depending upon whether the initial phase error is positive or negative.

The output of Divide by Even M 30 is then applied to Divide-by-2 31, which assures that the loop output will be a symmetrical.

To close the phaselocked loop, the (approximately) 20,000 Hz output signal is applied to Pulse Delete Circuit 32. This circuit removes exactly one pulse from the 10 MHz signal obtained by applying the 20 MHz Clock to Divide by 2 33 for each negative-to-positive transition of the delete rate (~20 kHz) signal.

Figure 10:
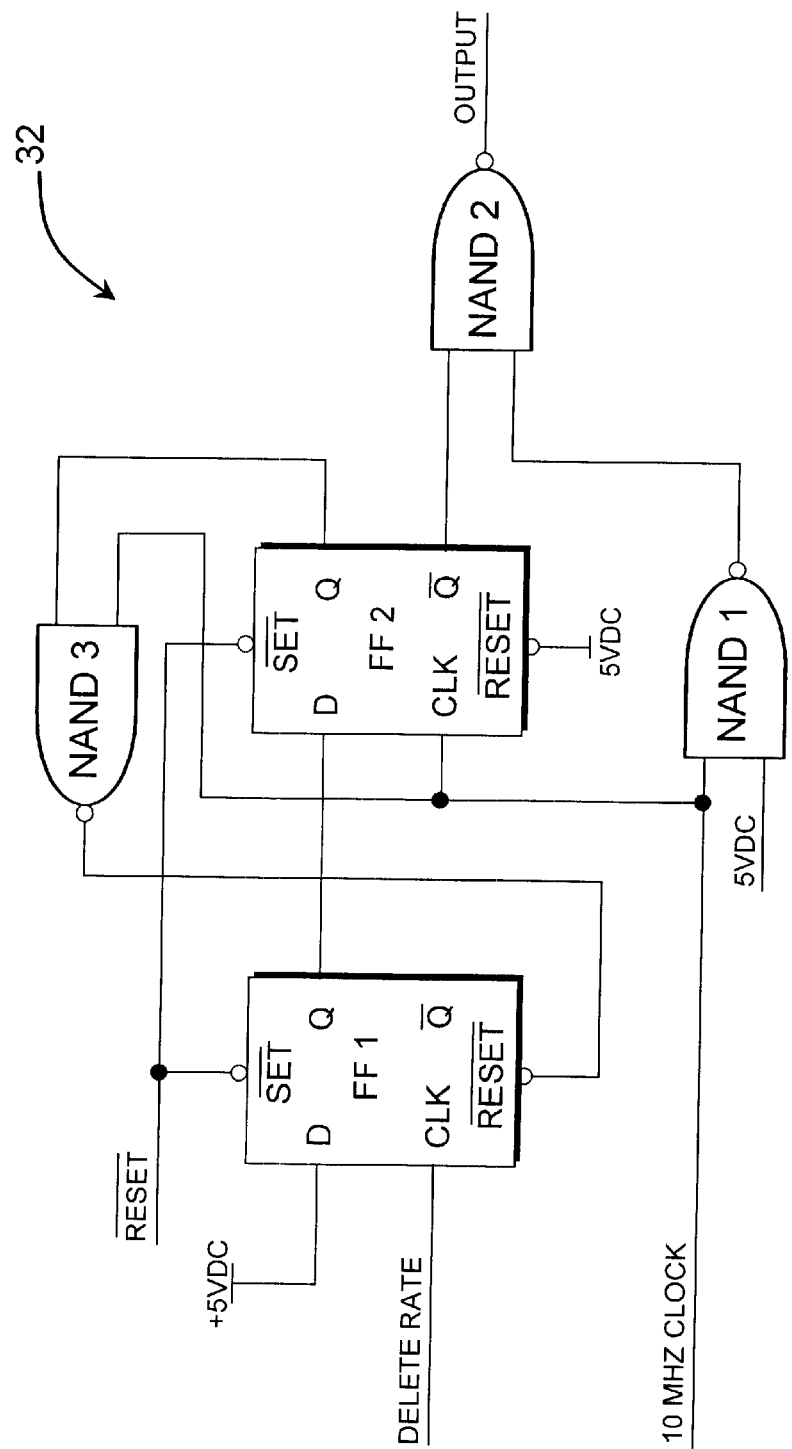
FIG. 10 is a detailed block diagram of a PULSE DELETE circuit employed in the phaselocked loop of FIG. 8.

Pulse Delete 32 (FIG. 8) is shown in detailed block diagram form in FIG. 10. After each pulse delete occurs, the input D flip-flop (FF1) is reset via NAND 3 to wait for the next positive transition of the delete rate signal.

Again referring to FIG. 8, the pulse train output of Pulse Delete 32 is applied to Divide-by-80,000 25 of conventional design. The output of Divide by 80,000 25 is a 124.75 Hz [(10,000,000−20,000)/80,000] signal with negligible jitter of just ±0.00225°.

As previously stated, the condition of lock exists when the two signals applied to XOR 24 are 90 degrees out of phase. Any phase deviation from that condition will cause the total number of pulses in the burst delivered to Count Register 29 each cycle to increase (or decrease) from its nominal average value of 250.5, thereby causing the output frequency to decrease (or increase) accordingly to drive the phase of the output of Divide-by-80,000 25 toward lock.

Referring to FIG. 1, the output of PLL 2 which is applied to U/D Converter 3 is the ~20,000 Hz output of Divide by 2 31 (FIG. 8). Up and Down counts are obtained by counting cycle slips between the PLL output and Output #2 of Frequency Reference 1 (FIG. 1). For these two signals to be at precisely the same frequency, it is necessary that each be related to the 20 MHz Clock 7 by exactly the same factor. From FIG. 2 the frequency $f_2$ of Output #2 is given by $$f_2 = 20 \text{ MHz}/1002$$

At lock, the output of the Divide by 80,000 25 (FIG. 8) must match the frequency of Outputs #4 and #5 (FIG. 2), which are combined to produce the input to PLL 2 (FIG. 1) as previously described. To establish the relationship between the PLL output $f_1$ and the output of Divide by 80,000 25 (FIG. 8) it is only necessary to equate the relationship between the output of that circuit and the derivation of he Output #4 and #5 from the 20 MHz Clock, $$(20 \text{ MHz}/2 - f_1)/80,000 = 20 \text{ MHz}/(1002 \times 160)$$

Which simplifies to $$f_1 = 20 \text{ MHz}/1002 = f_2$$

Figure 11:
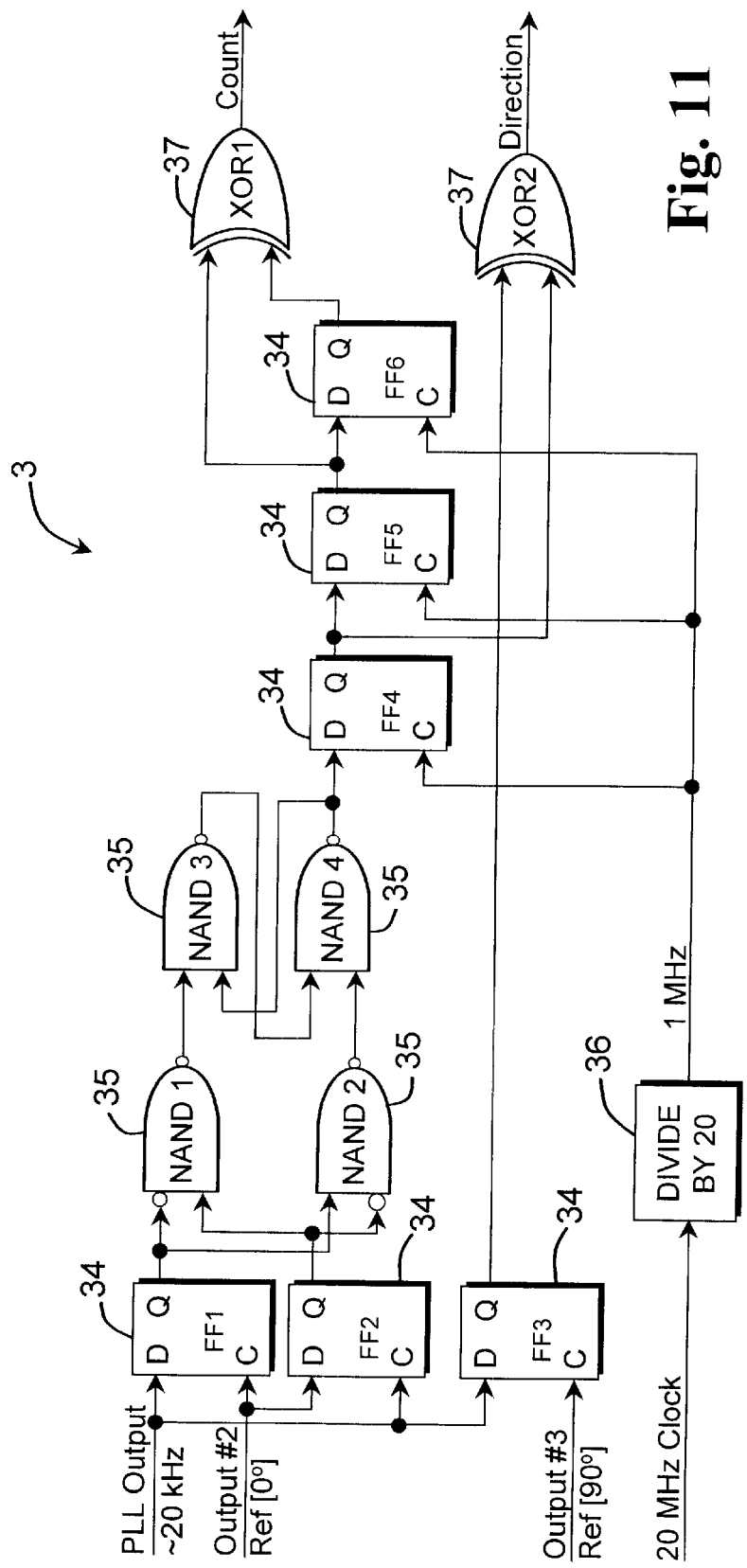
FIG. 11 is a detailed block diagram of the U/D CONVERTER of FIG. 1.

FIG. 11 illustrates a preferred embodiment of the U/D Converter 3 (FIG. 1) including "D" flip-flops 34, NAND gates 35, Divide by 20 circuit 36 of conventional design, and XOR (exclusive OR) gates 37, all of which are interconnected as shown. Although the circuit is shown and described in terms of conventional logic devices, it is preferably implemented within the previously described programmable logic array chip. The circuit provides a means for converting cycle slips between two signals at the same frequency to UP and DOWN counts.

As shown above, the PLL output and Output #2 from Frequency Reference are locked to the same frequency, but with a varying phase relationship that corresponds to the quantity being measured. The arrangement of NAND gates 35 serves to prevent false triggering of counts due to noise or phase jitter.

Each half-cycle phase change between the input signals produces a change in the output state of NAND 4. A 1 MHz clock signal is produced by applying the output of 20 MHz Clock 7 (FIG. 1) to Divide-by-20 36. This 1 MHz signal is used propagate the state of NAND 4 to flip-flops FF4, FF5 and FF6, in sequence at 1 microsecond intervals. On each occurrence of a change in state of NAND 4, the Q outputs of FF5 and FF6 will be different for one microsecond, causing a 1 microsecond positive "Count" pulse to appear at the output of XOR 1 for each half-cycle phase slip between the inputs.

The quadrature 20 kHz output from Frequency Reference 1 (FIG. 1), Output #3, is used to clock the PLL output to the output of FF3 so that the state of the PLL signal one quarter cycle before each transition of NAND 4 appears as one input to XOR2. The Q output of FF4 provides the other input to XOR 2. The direction of each count is then determined by whether the two inputs to FF2 are different, causing the output of XOR2 to be high (UP count), or the same, producing a low output from XOR 2 (DOWN count).

Figure 12B:
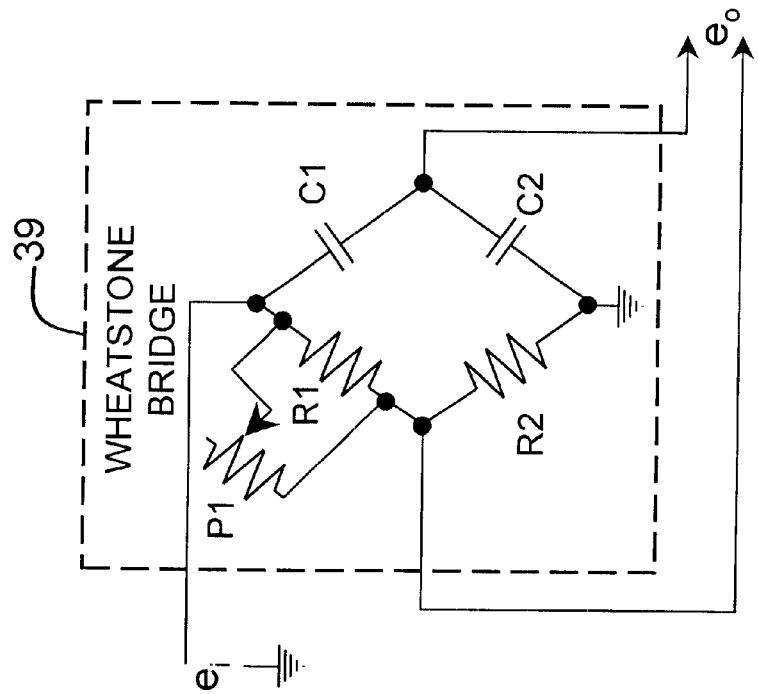
FIG. 12a and FIG. 12b are schematic diagrams of Wheatstone bridge networks for inductance and capacitance measurement, respectively.
Figure 12A:
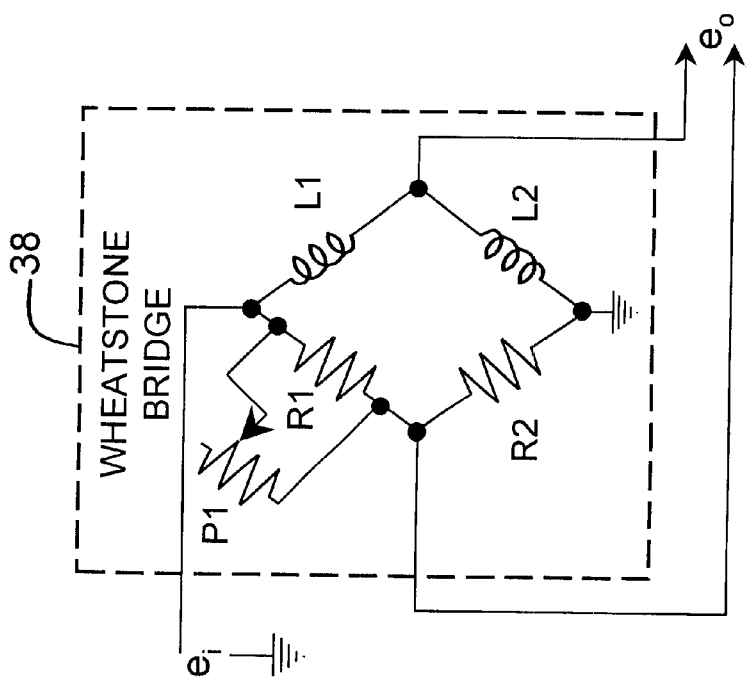

A preferred embodiment of the invention has been described in terms of measurements performed on resistance sensors connected in a Wheatstone bridge network 17 (FIG. 4). Other embodiments employing capacitors, inductors and even combinations of passive components, either in a Wheatstone bridge or some other network configuration will be readily apparent to those skilled in the art. FIG. 12 depicts examples of inductance and capacitance Wheatstone bridge networks. Both the inductance version 38 and the capacitance version 39 employ resistors R1 and R2 and potentiometer P1 in one leg of the bridge. This simplifies balancing the bridge and does not introduce a phase shift since the entire input signal $e_i$ is applied across either purely resistive or purely inductive (or capacitive) elements.

Figure 13:
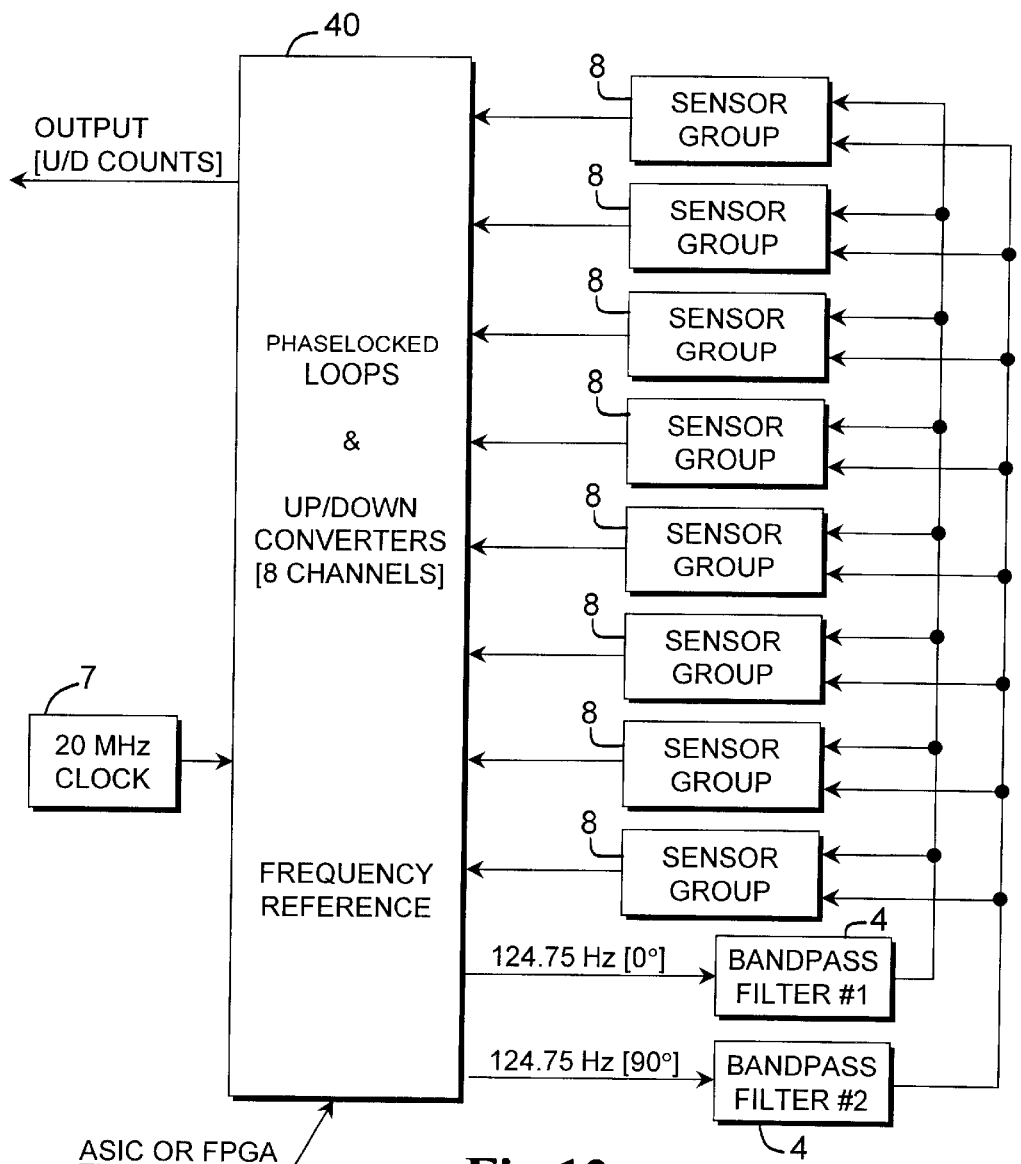
FIG. 13 is a block diagram of apparatus for direct digital measurement of multiple independent phenomena that produce changes in electrical properties in accordance with the invention.

FIG. 13 depicts an embodiment of the invention useful for simultaneous measurement of outputs from multiple independent sensors. Only one 20 MHz Clock 7 (FIG. 1) is used. Likewise, previously described Bandpass Filters #1 and #2 4 (FIG. 1) are used just once in the multi-channel embodiment depicted in FIG. 13. The Frequency Reference 1 (FIG. 1), multiple PLLs (phaselocked loops) 2 (FIG. 1), and multiple U/D Converters 3 (FIG. 1) are all implemented within a single programmable logic device 40, such as an ASIC or FPGA. A typical example of such a logic device is the Xilinx XCS30-3TQ144C, a 30,000-gate FPGA. Only the Sensor Group 8 (FIG. 1) is replicated for all channels. The Sensor Group 8 comprises the Sensor Analog Circuit 5 (FIG. 1) and Filter/Limited 6 (FIG. 1), both of which have been previously described.

While preferred embodiments of the invention have been shown and described, these embodiments are to be considered exemplary rather than restrictive, and various modifications can be made without departing from the principles and spirit of the invention, the scope of which is defined in the appended claims.

What is claimed is:

1. Measurement apparatus comprising:
    means for providing a first signal of constant frequency and phase;
    amplitude changing means for producing amplitude changes in said first signal proportional to a phenomenon, property or condition to be measured;
    generating means responsive to said amplitude-changed first signal for generating a second signal having a phase which varies in proportion to said amplitude changes in said first signal,
    phaselocked loop means for producing an output signal phaselocked to said second signal, wherein phase changes in said second signal produce phase changes in said phaselocked loop output signal that are substantially greater than corresponding phase changes in said second signal.

2. Apparatus as set forth in claim 1, wherein said generating means consists of mixing said amplitude-changed first signal with a reference signal to generate said second signal.

3. Apparatus as set forth in claim 2 wherein said first signal and said reference signal are both derived from the same constant frequency source.

4. Apparatus as set forth in claim 3, wherein said first signal and said reference signal are identical in frequency and differ in phase by a predetermined, fixed phase angle.

5. Apparatus as set forth in claim 4, wherein said fixed phase angle is exactly 90 degrees.

6. Apparatus as set forth in claim 2, wherein said mixing means comprises a linear summing amplifier.

7. Apparatus as set forth in claim 1, wherein said means for providing first signal and said reference signal includes at least one frequency divider.

8. Apparatus as set forth in claim 1, wherein said amplitude changing means comprises a network containing one or more passive sensors that exhibit changes in electrical properties proportional to the phenomenon, property or condition to be measured.

9. Apparatus as set forth in claim 8, wherein said sensors comprise resistors.

10. Apparatus as set forth in claim 8, wherein said sensors comprise capacitors.

11. Apparatus as set forth in claim 9, wherein said resistors are temperature sensing resistors.

12. Apparatus as set forth in claim 8, wherein said sensors comprise inductors.

13. Apparatus as set forth in claim 9, wherein said resistors are strain gages.

14. Apparatus as set forth in claim 8, wherein said network comprises a Wheatstone bridge.

15. Apparatus as set forth in claim 1, wherein the frequency of said phaselocked loop output signal is a multiple of the frequency of said second signal.

16. Apparatus as set forth in claim 15, wherein said phaselocked loop output signal is subtracted from said constant frequency reference source by means of a pulse deletion circuit.

17. Apparatus as set forth in claim 16, wherein the output of said pulse deletion circuit is applied to a divider to produce a signal at a frequency equal to the frequency of said second signal.

18. Apparatus as set forth in claim 1, further comprising phase measurement means for measuring the relative phase of said phaselocked loop output signal and a constant frequency reference signal.

19. Apparatus as set forth in claim 18, wherein said phase measurement means comprises up/down counting means responsive to full-cycle phase variations between said phaselocked loop output signal and said reference signal.

20. Apparatus as set forth in claim 18, wherein said phase measurement means comprises up/down counting means responsive to fractional cycle phase variations between said phaselocked loop output signal and said reference signal.

21. Apparatus as set forth in claim 1, wherein said first signal and said reference signal are used in combination with a plurality of independent amplitude changing means, combining means, and phaselocked loop means to provide a multi-channel measurement apparatus.

22. A measurement method in which a phenomenon, property, or condition to be measured produces amplitude changes in a fixed-frequency reference signal to produce an amplitude-changed reference signal, and in which the amplitude-changed reference signal is employed to produce another signal that is phase shifted in proportion to amplitude changes in the amplitude-changed signal, and in which the phase-shifted signal is employed to produce corresponding, but substantially greater, phase changes in another signal, that produces an output.

23. A method according to claim 22, wherein amplitude changes are produced by applying the fixed reference signal to a network containing one or more passive sensing elements such as resistors, inductors or capacitors, or a combination thereof.

24. A method according to claim 22, wherein the phase-shifted signal is produced by adding the amplitude-changed reference signal to a second reference signal that has a fixed phase offset with respect to the amplitude-changed signal.

25. A method according to claim 22, wherein a phase-locked loop is used to multiply the phase changes in the phase-shifted signal.

26. A method according to claim 25, wherein phase multiplication is produced by subtracting the phaselocked loop output from a fixed-frequency reference at a substantially higher frequency, and dividing the resulting signal by a factor that produces a signal to be applied to the loop phase detector, which signal is at a frequency exactly equal to the phase-shifted input to the phaselocked loop.

* * * * *